United States Patent [19]

Williams

[11] Patent Number: 4,882,747
[45] Date of Patent: Nov. 21, 1989

[54] INFRARED COMMUNICATION APPARATUS FOR REMOTE SITE APPLICATIONS

[76] Inventor: Jerry Williams, 4087 Norton Ave., Oakland, Calif. 94602

[21] Appl. No.: 193,016

[22] Filed: May 12, 1988

[51] Int. Cl.$^4$ ........................................... H04M 11/00
[52] U.S. Cl. .................................. 379/102; 358/194.1; 455/603; 379/105
[58] Field of Search ..................... 358/194.1; 455/603; 379/105, 104, 102, 96

[56] References Cited

U.S. PATENT DOCUMENTS

| | | | |
|---|---|---|---|
| 4,628,541 | 12/1986 | Beavers | 455/603 |
| 4,771,283 | 9/1988 | Imoto | 358/194.1 |
| 4,785,472 | 11/1988 | Shapiro | 379/105 |

FOREIGN PATENT DOCUMENTS

| | | | |
|---|---|---|---|
| 0183540 | 6/1986 | European Pat. Off. | 379/96 |
| 2166322 | 4/1986 | United Kingdom | 379/102 |

Primary Examiner—Jin F. Ng
Assistant Examiner—Wing F. Chan
Attorney, Agent, or Firm—Michael W. Sales

[57] ABSTRACT

An infrared communication device for simultaneously controlling video display systems at a plurality of locations from a single master site. The system is useful with, for example, a teleconferencing system that includes a conventional infrared remote control unit at each conference site and a video display system under the control of an infrared signal transmitted by the remote control unit. the infrared communication device includes an infrared receiver for receiving an infrared control signal, a microprocessor for digitizing the received signal, and a modem. The device also includes an infrared transmitter for retransmitting an infrared control signal identical to the original infrared control signal to the video display system at the master site. A corresponding digitized signal is provided to the modem which communicates with the off-site location over commercial phone lines. The slave modem receives the incoming digital signal which is decoded and then retransmitted as an infrared control signal at that site. A plurality of such infrared communication devices may be used at a plurality of conferencing locations and used in various master/slave modes. In a broad aspect, the communication device may be adapted for use with any infrared light activated video control system and to control systems other than video display systems.

7 Claims, 3 Drawing Sheets

INFRARED COMMUNICATION APPARATUS FOR REMOTE SITE APPLICATIONS

This invention relates to communication systems and, in particular, relates to an infrared communication apparatus that provides simultaneous video control at a number of remote teleconferencing sites from a central teleconferencing location.

BACKGROUND OF THE INVENTION

Present day teleconferencing systems consist primarily of full motion or near motion teleconferencing systems. These systems generate high resolution images much like pictures seen on commercial television.

Unfortunately, these systems are often highly sophisticated and require significant investment in special offices and equipment. For example, many of these system require special broadcast rooms and commercial-TV grade cameras for generating a broadcast that is then communicated over a satellite link to a number of remote locations. Such systems require high speed data channels and high frequency transmission in order to maintain high quality image resolution.

Even less sophisticated systems, using conventional carrier data communication, have a lower band width limit of about 56 kilohertz.

Because of the need for sophisticated equipment, special broadcasting facilities, and wide band widths, these systems are not only overly expensive for general application, but also cannot be used with every day phone link hookups.

Thus, there exists a strong need for a simple, low cost, and phone compatible system that would permit video teleconferencing from a central location to a plurality of off-site locations.

SUMMARY OF THE INVENTION

According to the invention, there is provided an infrared communication device for simultaneously controlling video display systems at a plurality of locations from a master site. The system is useful with, for example, a teleconferencing system that includes a conventional infrared remote control unit at each conference site and a video display system under the control of an infrared signal transmitted by the remote control unit.

The infrared communication device includes an infrared receiver for receiving an infrared control signal, a microprocessor for digitizing the received signal, and a modem. The device also includes an infrared transmitter for retransmitting an infrared control signal identical to the original infrared control signal to the video display system at the master site. A corresponding signal is provided to the modem which communicates with the off-site location over commercial phone lines. The slave modem receives the incoming digital signal which is decoded and then retransmitted as an infrared control signal at that site.

A plurality of such infrared communication devices may be used at a plurality of conferencing locations and used in various master/slave modes. One configuration for providing video control at a plurality of off-site locations includes a plurality of master devices disposed in series such that the infrared control signal is successively handed over from one master device to another. A corresponding digitized control signal from each master device is simultaneously provided to a corresponding slave device at an off-site location.

In a broad aspect, the communication device may be adapted for use with any infrared light activated video control system and to control systems other than video display systems.

Further objects, features and advantages of the invention will become apparent by reference to the following drawings, the description, and the appended claims.

DETAILED DESCRIPTION OF THE DRAWINGS

The invention will first be explained by reference to FIG. 1 which shows an infrared communication device as used in a video display system under the control of a hand-held remote infrared control unit.

The invention will then be explained by reference to FIG. 2 which shows a master video display system at a local site in communication with a slave video display system at an off-site location where the two systems are in communication using infrared communication devices according to the invention.

The invention will then be explained by reference to FIGS. 3A and 3B which are detailed diagrams according to invention that show an infrared receiver, a microprocessor, a programmable memory, a modem, an infrared transmitter, and associated circuitry.

The invention will then be explained by reference to FIG. 4 which shows a plurality of the infrared devices connected in series for simultaneously providing the same video display functions at a plurality of off-site locations.

Normally, a local video display system is controlled by pointing the hand-held infrared control device at an infrared receiver on a video display system. The remote control device is a conventional, hand-held key pad operated device that causes a number of select displaying functions in the system, such as scrolling, indexing, and moving from frame to frame or within frames. According to the invention, all the featurs that are available for normal control at the local site are also now available at each of the plurality of off-site locations.

These features are provided by conveying digitized control signals via a modem at the local site to a modem at the remote site over ordinary commercial phone lines. In summary, this signal is received by the modem and decoded by the microprocessor. The microprocessor regenerates a pulse controlled sequence that is provided to the infrared transmitter in the infrared control device at the off-site location. The off-site infrared communication device thereafter transmits an infrared signal to an infrared controlled video display system at its remote location.

Although the invention will be explained by reference to specific embodiments, it should be understood that in its broadest aspects, the invention is not limited to an infrared communication device, but is applicable for any video display system using a light activated control system.

Further, in another broad aspect, the invention is not limited to providing simultaneous control simply for video display systems, but can be used to provide simultaneous master control for a plurality of slave systems under infrared control at a number of sites.

Figure 1:
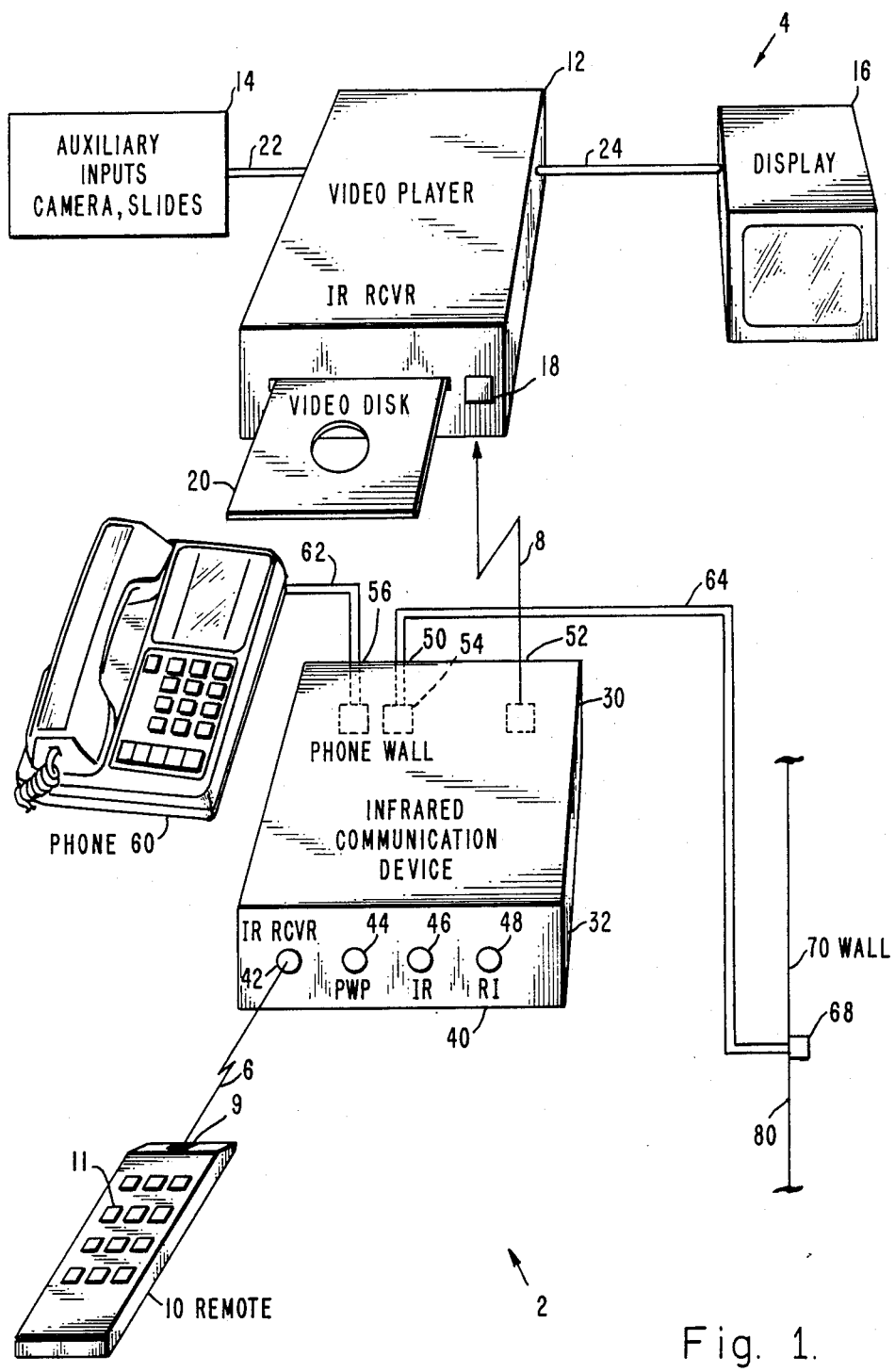
FIG. 1 is a diagram of a video communication system according to one embodiment of the invention.

Refer now to FIG. 1 which shows a local site 2 at which a teleconference is ongoing. The teleconference is conducted using a video display system 4.

The video display system 4 includes a video player 12, a remote control unit 10, an auxiliary unit 14 (such as a camera or slides), and a video display unit 16. Video player 12 receives a video disk 20 or an input from auxiliary unit(s) 14 via input line(s) 22 to provide outputs over line 24 to video display unit 16.

Video player 12 is normally controlled by a human activated infrared remote control unit 10. Control unit 10 transmits an infrared control signal 6 to an infrared receiver 18 disposed on a face of video player 12. Remote unit 10 is a conventional, hand-held remote control unit that includes a key pad 11 which causes the video display system 4 to undergo a variety of programmed video display reponses when an infrared signal is received at infrared receiver 18.

According to the invention, an infrared communication device 30 provides a means for simultaneously generating these same video display responses for a video display system at an off-site location (not shown).

The infrared communication device includes a modular housing 32 having a plurality of light function units (LED's) 40 disposed about one face. An infrared receiver 42 is also disposed about the same face and receives the infrared control signal from remote infrared control unit 10.

The infrared communication device includes an infrared transmitter 52 that repeats transmission of a regenerated, functionally identical infrared control signal 8 to the infrared receiver 18 in the video player 12.

The infrared communication device also includes a modem and additional circuitry which facilitate communication with off-site locations.

A phone input/output jack 56 connects a phone 60 to the device 30 over a line 62. phone 60 may be a conventional home or office phone.

A "wall" (phone line) output jack 54 connects a normal conventional wall jack 68 to the communication device 30 over a phone line 64. Wall jack 68 is connected to a commercial phone system over conventional phone lines 80.

Except for the device 30, all of the foregoing components are commercially available off-the-shelf video components, sold, for example, by General Parametrics of Berkeley, Calif.

Figure 2:
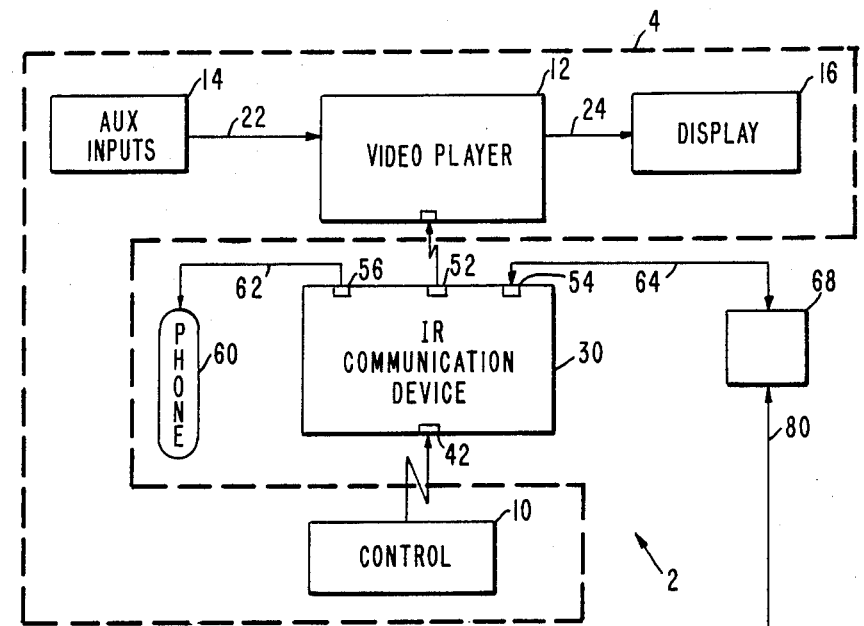
FIG. 2 shows two infrared communication devices in a master/slave communication mode for teleconferencing according to one embodiment of the invention.
Figure 2:
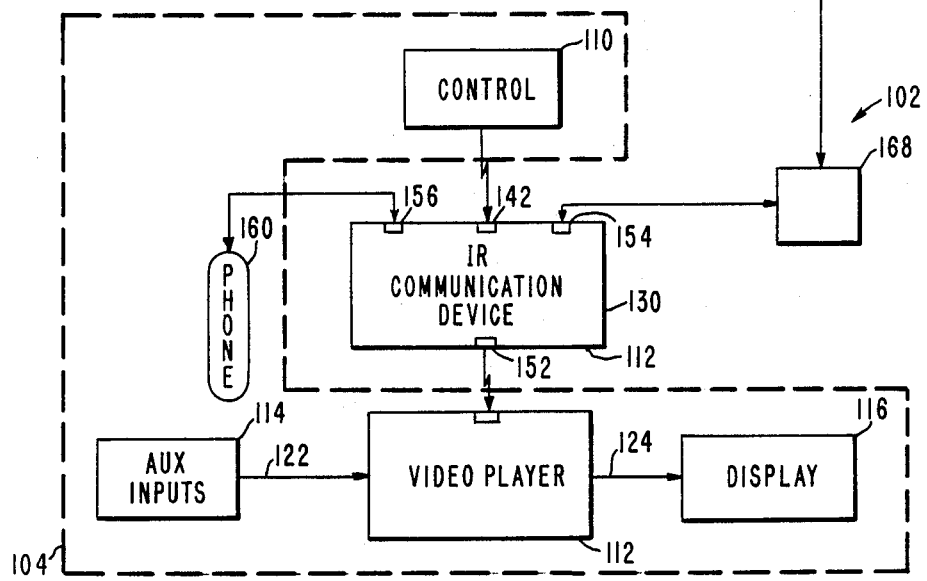

Refer now to FIG. 2 which shows a master video display system 4 at a local site 2 which communicates with a slave video display system 104 at site 102. Display system 4 communicates with display system 104 by providing a digitized phone signal output from the infrared communication device 30 over line 80 to the infrared communication device 130.

The slave video display system 104 includes similar video display units as the master system at site 2. In particular, video player 112 should normally be provided with the same video disk (not shown) as video player 12 so that the same images are being controlled at both sites.

Although FIG. 2 has been discussed with the video system 4 as the master system, it should be understood that systems 4 and 104 may intermittently interact or change roles such that video system 104 may at times be the master unit and video system 4 the slave unit.

Figure 3A:
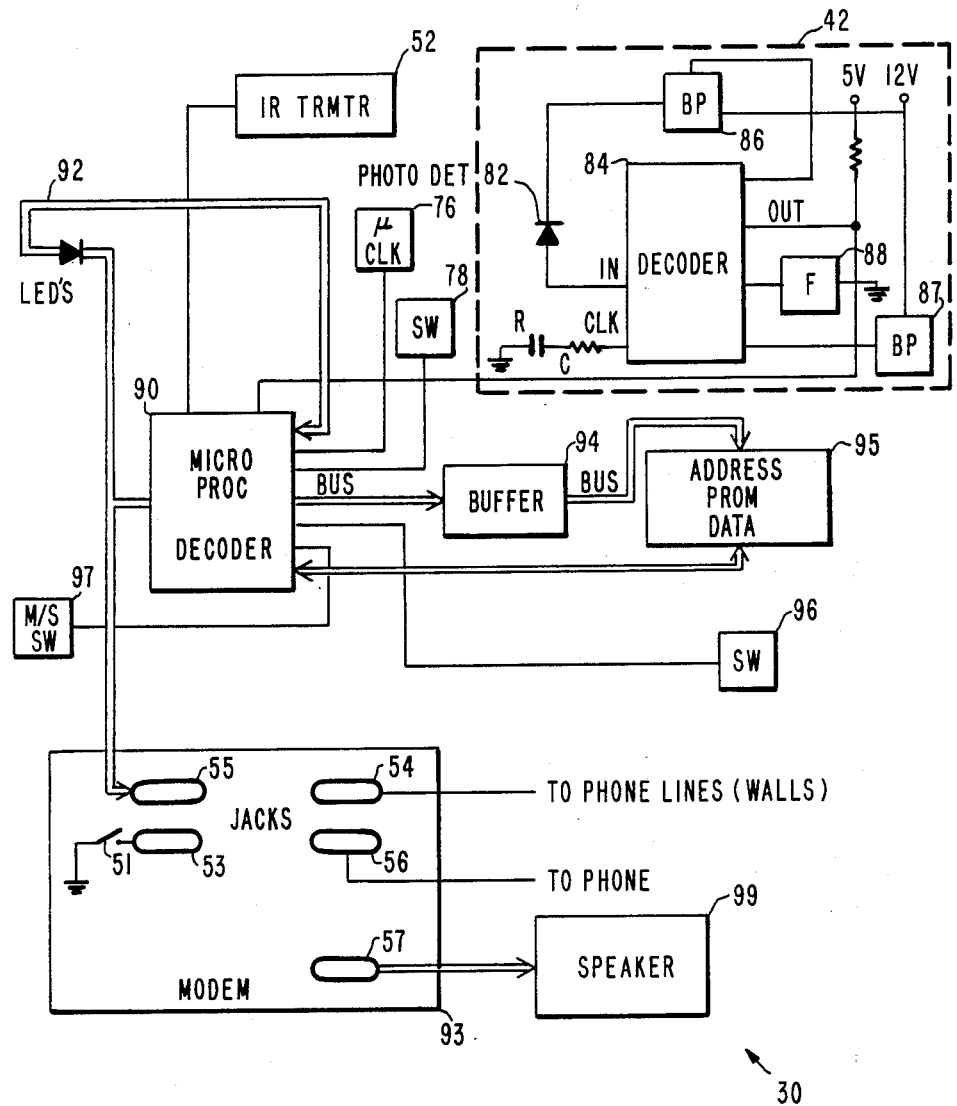
FIG. 3A is a detailed circuit diagram of an infrared communication device according to one embodiment of the invention.

Refer now to FIG. 3A which shows a detailed block diagram of an infrared communication device according to one embodiment of the invention.

The infrared communication device 30 includes an infrared receiver 42. The infrared receiver 42 has a photo detector 82 that receives the infrared control signal from a remote unit not shown. Photo detector 82 is coupled to an IN input of infrared decoder chip 84. Infrared decoder chip 84 provides a series of pulses as output to drive a microprocessor (signal decoder) 90.

The infrared receiver 42 also includes a tuning circuit 86, and noise filtering components 87 and 88. High frequency noise filtering is also controlled through the inclusion of a resistor capacitor series circuit.

Tuning circuit 86 improves decoder performance by providing high circuit gain to only those incoming signals of the same frequency as that being transmitted by the hand held control control unit, i.e., 40 kHz, for example. Filter circuits 87 and 88 are used for filtering out unwanted signal components arising from power supply noise and unwanted infrared light input into the photodetector 82.

The RC filter circuit serves to diminish the sensitivity of the detector to signals above the desired frequency.

Figure 3B:
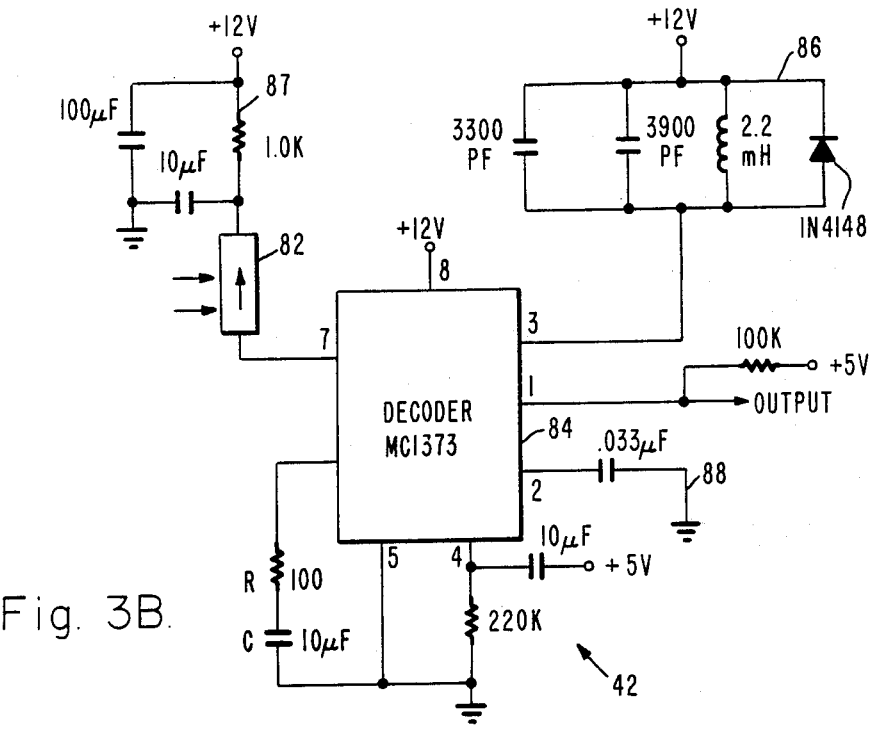
FIG. 3B is a detailed circuit diagram of an infrared receiver as used in one embodiment of the invention.

A detailed circuit diagram of an infrared receiver for an embodiment of the invention such as the one shown in FIG. 3A is shown in FIG. 3B.

It should be understood that the operating frequency of the system may be changed depending on the frequency of the transmitted devices and the environment in which the infrared control device is used. For example, this rate could be reduced if the infrared device. 30 is used for driving a servo motor as opposed to being used in a high speed application.

Referring again to FIG. 3A, the decoder 84 outputs one bit pulses that are coupled to an input of the microprocessor 90. Microprocessor 90 is, for example, a conventional off-the-shelf 8031 microprocessor made, for example, by Intel Corporation. The microprocessor 90 reads this bit and determines the state of the input signal from encoder 84. Microprocessor 90 is software driven to decode the inputs from encoder 84 under control of a PROM chip 95. Decoder 90 thus performs logical filtering of useful input. In summary, microprocessor 90 samples, assesses, and regenerates the pulses which are input from infrared decoder 84.

A plurality of light emission devices (LED's) are coupled to outputs from microprocessor 90 to provide an indication of the state of microprocessor 90 and associated circuitry. Each LED is driven by a separate output bit from the microprocessor 90.

The communication device 30 also includes a modem 93 that is connected to the microprocessor 90. The modem 93 is an off-the-shelf device and may be mounted piggy-back atop the processing circuitry in the device 30. Modem 93 may be, for example, a commercial, off-the-shelf Everex System model 912 modem.

A bus buffer 94 is coupled to a plurality of bit outputs from microprocessor 90. The buffer 94 keeps the microprocessor bus drive requirements to a minimum in accordance with conventional practices.

PROM 95 is coupled to an address bus from buffer 94. PROM 95 contains the source code which controls programming for the microprocessor 90.

The output of PROM 95 is coupled to data inputs to signal decoder/microprocessor 90.

Also shown in FIG. 3A is a remote master/slave switch 96. Switch 96 is an internal switch that is normally left in the master position and is coupled to a reset input of microprocessor 90. Thus, when device 30 is initially powered up, switch 96 determines whether the device 30 operates in the master or slave mode.

Referring still to FIG. 3A, modem 93 includes a plurality of switches 51 that permit enabling or disabling of selected conventional modem functions. Switches 51 are dual in-line packet switches. Typical functions represented by each switch would be, for example, carrier data, received data, transmit data, etc.

Modem 93 also includes input/output ports or jacks 54 and 56. Input/output jack 54 is for connecting to commercial phone lines to off-site locations. Input/output port 56 is for communicating with a local phone (not shown). The local phone initiates communications off-site, as well as providing hang-up and answering functions.

Modem 93 also includes input jacks 55 for receiving digitized inputs from the microprocessor 90.

Output jacks 55 are also coupled to LED's 92 to permit visual indications of functions ongoing in modem 93.

Also coupled to an output of modem 93 is a speaker circuit 99. Speaker circuit 99 is a conventional circuit that includes a driver circuit, and a speaker. The speaker circuit enables a user to hear a carrier received from the remote site and to hear a connecton at the receiving site. Speaker circuit 99 is coupled to modem 93 via output jacks 57.

It should be understood that microprocessor as used herein refers to the foregoing microprocessor decoder in a narrow sense and to the microprocessor decoder, buffer, PROM, and associated processing circuitry of FIG. 3A in a more generic sense.

The infrared communication device of FIG. 3A operates as follows.

To initiate communication with an off-site location, the phone connected to the infrared communication device is taken off hook and is dialed into the off-site location. When a connection is made with the phone at the off-site location, the modem emits a cueing sound over the speaker system.

The cueing sound indicates that the master/slave switch should be placed in the master mode at the local site. The infrared communication device is placed in the master mode by toggling the master/slave switch that is located external to the communication device.

A second squelched sound indicates that a connection has been established with the off-site location.

The phone may be hung up after hearing the squelched sound and control may be initiated with the remote unit.

Next, an infrared control signal input is received at a photo detector from the master remote control unit. This signal is decoded at the decoder in the infrared receiver. The infrared decoder outputs bits at a rate of 40 kilohertz to the microprocessor/signal decoder.

The microprocessor decodes the input pulsees and provides regenerated pulses to the IR transmitter 52. The microprocessor also sends corresponding digital control signals to the modem for control of the offsite unit.

The infrared transmitter transmits the regenerated control signal to a local video display system which responds as to the original infrared signal. The infrared transmitter circuit may include, for example, a driver transistor, current limiter resistor, a photo emitter, as for a conventional infrared transmitter circuit. For the embodiment in FIG. 3, the microprocessor pulses the IR transmitter with single bits at the 40 kilohertz rate.

After communication has been established with the off-site location using a phone (not shown), the speaker circuit gives tonal indications of answering activities. The LED's give a visual indication of ongoing activities in the modem.

The modem thereafter communicates the digitized control signal to an off-site location where a slave device decodes the digitized signal and retransmits an identical infrared control signal.

Figure 4:
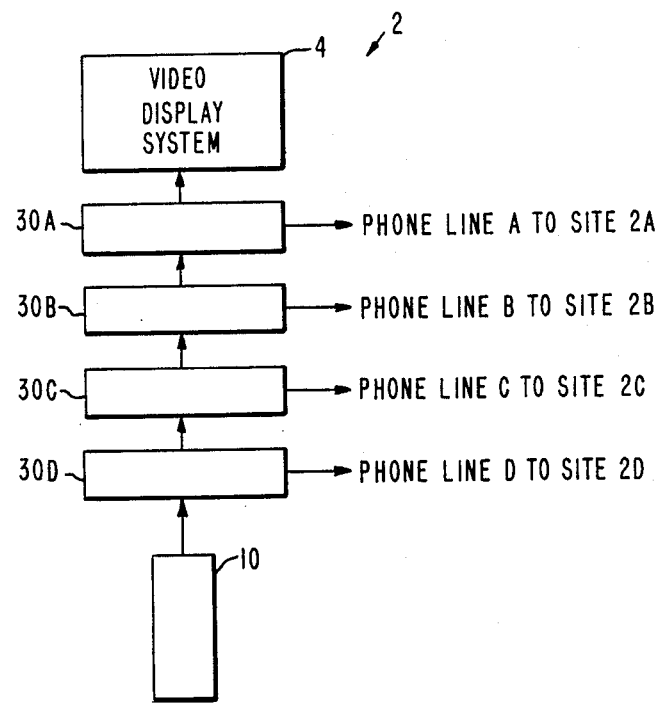
FIG. 4 shows a series of infrared communication devices arranged in series according to another embodiment of the invention.

Refer now to FIG. 4 which shows a plurality of infrared communication devices according to another embodiment of the invention. In FIG. 4, a video display system 4 at a local site 2 is normally driven by a remote control infrared unit 10. According to the invention, a plurality of infrared communication devices 30A–30D are interposed between the remote control unit 10 and the video display system 4.

The devices 30A–30D are disposed in a series relationship and the infrared control signal originally received at unit 30D is successively handed over from unit 30D to unit 30C to unit 30B to unit 30A and utimately to the video display system 4.

As the infrared signal is received by each device, the signal is decoded and a digitized signal provided over output lines D, C, B, and A, successively, to a plurality of off-site locations 2D, 2C, 2B, and 2A. According to this embodiment, teleconferencing can be accomplished simultaneously and with the same video control results at a plurality of off-site locations. This configuration permits communication with a plurality of off-site locations without requiring any one modem to drive by itself a plurality of other modems. This configuration is particularly significant because when modems are fed in parallel, incoming and outcoming tones create confusion and ultimately noise. According to this embodiment, each modem at the local site communicates only with one modem off-site.

This configuration also dispenses with the need for an intelligent control module. In addition, this configuration avoids the need for a complicated spatial infrared transmitting configuration that would be required if all units were receiving a single infrared control signal in parallel from a single infrared transmitter.

Having thus described the invention in terms of the foregoing embodiments, it should be understood that modifications, variations, and changes may be made to be discussed in embodiments within the scope of the invention.

It should therefore be understood that it is applicant's intention that the invention only be limited by the appended claims.

What is claimed is:

1. A communication system comprising:
   a first infrared control unit at a first site;
   a video display system under control of an infrared signal transmitted by said first control unit;
   a second infrared control unit at a second site;

a second video display system under control of an infrared signal transmitted by said second control unit; and a first infrared communication device at said first site and a second infrared communication device at said second site, each said infrared communication device comprising:

an infrared receiver for receiving an infrared control signal from the control unit at its site;

a microprocessor for decoding said received control signal to generate digitized control signals;

an infrared transmitter for retransmitting a regenerated infrared control signal to the display system at its site;

a modem for communicating and receiving digitized control signals over phone communication lines to the other site; and a phone at each site for establishing a phone line communication link for said modem with said other site.

2. The invention of claim 1 and wherein said first and second communication devices are configured in a master/slave relationship for simultaneously displaying the same video images.

3. The invention of claim 1 and wherein each of said first and second control unit is a hand-held remote infrared transmitter having a key pad control.

4. A communication system comprising:

a first infrared control unit at a first site;

a video display system under control of an infrared signal transmitted by said first control unit;

a second infrared control unit at a second site;

a second video display system under control of an infrared signal transmitted by said second control unit; and a first infrared communication device at said first site and a second infrared communication device at said second site, each of said infrared communication devices comprising:

an infrared receiver for receiving an infrared control signal from the control unit at its site;

a microprocessor for decoding said received control signal to generate digitized control signals;

an infrared transmitter for retransmitting a regenerated infrared control signal to the display system at its site;

a modem for communicating and receiving digitized control signals over phone communication lines to the other site; and a phone at each site for establishing a phone line communication link for said modem with said other site, said communication system further comprising a plurality of said first infrared communication devices disposed in series at a master site for simultaneously communicating over phone lines to a plurality of said second infrared communication devices at a corresponding plurality of second slave sites.

5. In a video display system having an infrared control device, and a video device controlled by an infrared control signal transmitted by said control device, an infrared communication device comprising:

an infrared receiver disposed between said control device and said video device for receiving said infrared control signal;

a microprocessor for decoding said received control signal to generate digitized control signals;

an infrared transmitter coupled to said microprocessor for repeating transmission of said infrared control signal to said video device; and a modem for communicating said digitized control signal over a phone link to an off-site location.

6. An infrared light activated communication device comprising:

an infrared light activated receiver for receiving an infrared light control signal;

a microprocessor coupled to said receiver for digitizing said received control signal;

a modem coupled to said microprocessor for communicating and receiving digitized control signals over phone communication lines; and an infrared transmitter for repeating transmission of said light control signal.

7. The invention of claim 6 further comprising:

a plurality of said infrared communication devices disposed in series for simultaneously providing a corresponding plurality of identical output control signals.

* * * * *